No. 862,210. PATENTED AUG. 6, 1907.
E. R. STASCH.
CORRUGATING MACHINE.
APPLICATION FILED JAN. 19, 1907.
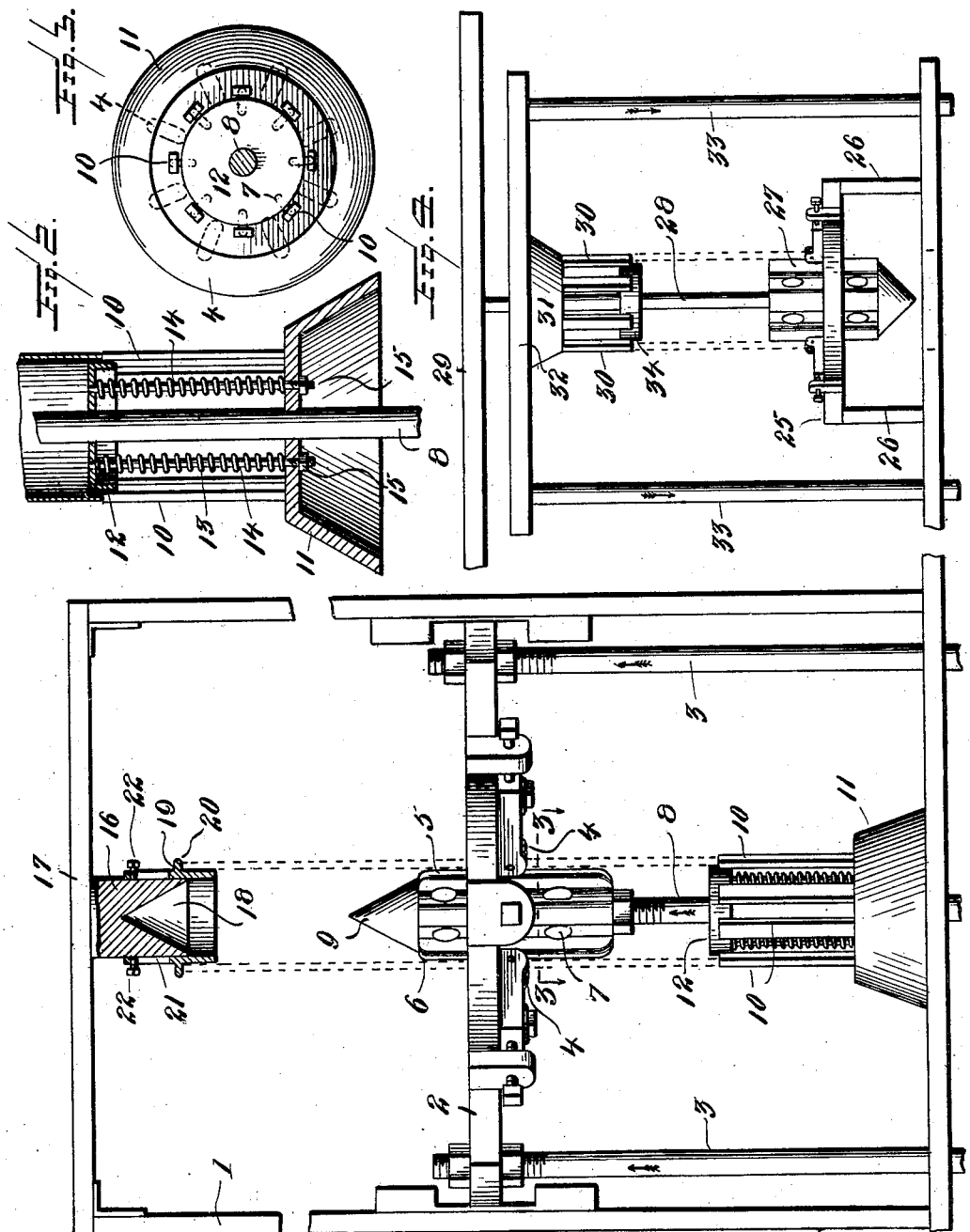
WITNESSES:
INVENTOR
Emil R. Stasch
BY
Attorney

UNITED STATES PATENT OFFICE.

EMIL R. STASCH, OF CORNING, NEW YORK.

CORRUGATING-MACHINE.

No. 862,210.　　　Specification of Letters Patent.　　　Patented Aug. 6, 1907.

Application filed January 19, 1907. Serial No. 353,106.

*To all whom it may concern:*

Be it known that I, EMIL R. STASCH, a citizen of the United States, residing at Corning, in the county of Steuben, State of New York, have invented certain new and useful Improvements in Corrugating-Machines, of which the following is a specification, reference being had therein to the accompanying drawing.

This invention relates to a corrugating machine, and particularly to means for removably supporting the tube or pipe in position for the corrugating action.

The invention has for an object to provide a novel and improved construction of the tube supporting means consisting of separated supports or fingers disposed relatively to the corrugating devices so that one of said parts may pass over the other in order that the corrugations may be continued to the ends of the tube while in the machine.

Other and further objects and advantages of the invention will be hereinafter set forth and the novel features thereof defined by the appended claims.

In the drawing: Figure 1 is an elevation with parts in section; Fig. 2 is an enlarged vertical section of the supporting devices; Fig. 3 is a similar horizontal section on the line 3—3, Fig. 1; and Fig. 4 is an elevation of a modified form of the invention.

Like numerals refer to like parts in the several views of the drawing.

Referring to the drawing, in the form of the invention shown in Fig. 1, the numeral 1 designates a frame of any desired character, the sides of which comprise ways for the cross head 2 which may be actuated in any suitable means, for instance, rods 3 extending to any suitable source of power. This cross head is provided with any desired form of corrugating device, for instance, such as shown in my prior patent #832,001, September 26, 1906 and comprises essentially corrugating rollers 4 mounted on the cross head and coöperating with the faces 5 upon the mandrel 6, while this mandrel is provided with corrugating rollers 7 disposed intermediate of the rollers 4 of the cross head and driven by a rod or piston 8 in unison with the rods 3 so that said mandrel and cross head are always in fixed relation to each other. This mandrel is also provided with a tapered or conical head 9 to center the pipe or tube in proper position.

The tube, as shown by dotted lines in Fig. 1, is supported at one end upon the arms or supports 10 extending rigidly from the base 11 and separated from each other so as to permit them to extend between the mandrel and cross head when said parts are brought into position over each other as at the completion of the corrugating action for the ends of the tubes. Within these fingers a supporting head or disk 12 is disposed and slidably mounted upon the plunger rod 8 so as to extend upward within the lower end of the tube to prevent lateral displacement thereof when in position. This head is forced downward within the supporting fingers by contact of the mandrel therewith when these parts are brought together. The head is supported in its uppermost position by means of the springs 13 encircling the rods 14, and the upward travel of the head is limited by means of the nut or projection 15 upon the lower end of the rods. These rods travel freely through the base 11 in the downward movement of the head upon the rod 8.

The opposite end of the tube, as shown by dotted lines in Fig. 1 is supported by the block 16 carried upon the cross bar 17 of the frame and provided with a recess 18 corresponding to the shape of the head 9 of the mandrel so as to permit the continued movement thereof for the full corrugating action. Surrounding this block is a sleeve 19 provided with a rib or flange 20 to rest upon the end of the tube. This sleeve is also slotted as at 21 to permit a sliding movement on the block and guided in such movement by the pins 22 extending through the slot.

In the form of the invention shown in Fig. 1 the mandrel and cross head comprising the corrugating device travel longitudinally for the length of the tube, but this may be directly reversed, as shown in the modified form in Fig. 4 wherein the cross head 25 is supported in fixed position by means of the standards 26, while the mandrel 27 is also relatively fixed by means of the rod 28 extending downward from the support 29. The fingers 30 are similar to those described in connection with Fig. 1, and extend from the base 31 mounted upon a movable cross head 32 which is actuated by means of the rods 33 so as to force the tube downward between the mandrel and cross head and permit said fingers to enter between the corrugating members so that the corrugations may extend to the end of the tube. In this form the head 34 is compressed by contact with the mandrel as before stated.

In the operation of the invention with the form shown in Fig. 1 where the mandrel and cross head are in contact with the base 11, the tube with its seam connected together is inserted over the head of the mandrel. The sleeve on the block is lifted and set within the opposite end of the tube. The corrugating device then begins its travel longitudinally of the tube and in such action forces the sleeve upward into contact with the support for the head, and as soon as the corrugating device has left the supporting fingers for the tube the head within these fingers rises into position and prevents lateral displacement of this end of the tube. The continued movement of the corrugating devices carries the action to the upper end of the tube, and in the return movement thereof the sleeve is restored to its position, as shown in Fig. 1, and may be lifted from the end of the tube after the corrugating device is again in contact with the base of the fingers so that the tube may be conveniently removed. In the modified form shown in Fig. 4 these fingers perform a similar function in connection with the head support and center one end of the tube, while the opposite end is forced between the mandrel and cross head comprising the corrugating device, the fingers also passing between these members to complete the action at the end of the tube.

It will be observed that the invention presents a novel and improved construction whereby the tube is accurately supported in its relation to the corrugating device, and the action thereof may be continued to the end of the tube.

Having now described my invention and set forth its merits, what I claim and desire to secure by Letters Patent is:—

1. In a corrugating machine, a corrugating device, and a tube engaging member comprising separated fingers disposed relative to the coöperating surfaces of said device.

2. In a corrugating machine, a corrugating device, a tube engaging member comprising separated fingers disposed relative to the coöperating faces of said device, and a yieldingly mounted head disposed within said fingers.

3. In a corrugating machine, a corrugating device, a tube engaging member comprising separated fingers disposed relative to the coöperating surfaces of said device, a head disposed within said fingers, and a spring beneath said head to normally project it beyond said fingers.

4. In a corrugating machine, a mandrel and coöperating device, a base, a series of separated fingers extended from said base, and means for moving the corrugating device toward and from said base.

5. In a corrugating machine, a mandrel and coöperating device, a base, a series of separated fingers extended from said base, means for moving the corrugating device toward and from said base, and a spring supported head disposed within the fingers to be engaged and moved by said mandrel.

6. In a corrugating machine, a movable mandrel, and coöperating member, a fixed supporting block, and a pipe engaging sleeve movably mounted upon said block.

7. In a corrugating machine, a movable corrugating device, a fixed supporting block, and a tube engaging sleeve slidably mounted upon said block.

8. In a corrugating device, a movable mandrel having a tapered guiding head, a fixed supporting block recessed to receive said head, and tube engaging means mounted upon said block.

9. In a corrugating machine, a corrugating device comprising oppositely disposed rollers, tube engaging fingers separted from each other and disposed upon a base, and means for relatively moving said parts whereby the fingers may pass between the opposite corrugating devices.

10. In a corrugating machine, a corrugating device comprising oppositely disposed rollers, tube engaging fingers separated from each other and disposed upon a base, means for relatively moving said parts whereby the fingers may pass between the opposite corrugating devices, and a yieldingly mounted head disposed within said fingers.

11. In a corrugating machine, a corrugating device comprising oppositely disposed rollers, tube engaging fingers separated from each other and disposed upon a base, means for relatively moving said parts whereby the fingers may pass between the opposite corrugating devices, a yieldingly mounted head disposed within said fingers, a supporting block at the opposite end of the tube from said head, and a tube engaging sleeve movably mounted upon said block.

12. In a corrugating machine, a corrugating device, tube engaging fingers separated from each other and mounted upon a base, a slidably mounted head disposed within said fingers, rods extending from said head through said base and provided with means to limit the outward movement of the head, and springs disposed upon said rods between said head and base.

In testimony whereof, I affix my signature in presence of two witnesses.

EMIL R. STASCH.

Witnesses:
ALFRED T. GAGE,
LEWIS HODGES.